(12) United States Patent
Clifton et al.

(10) Patent No.: US 9,400,619 B2
(45) Date of Patent: *Jul. 26, 2016

(54) NON-DISRUPTIVE FILE SYSTEM ELEMENT RECONFIGURATION ON DISK EXPANSION

(75) Inventors: John Mark Clifton, Hertfordshire (GB); Nicholas O'Leary, West End (GB)

(73) Assignee: International Business Machines Corporation, Armonk, NY (US)

( * ) Notice: Subject to any disclaimer, the term of this patent is extended or adjusted under 35 U.S.C. 154(b) by 779 days.

This patent is subject to a terminal disclaimer.

(21) Appl. No.: 13/452,591

(22) Filed: Apr. 20, 2012

(65) Prior Publication Data

US 2012/0209805 A1 Aug. 16, 2012

Related U.S. Application Data

(63) Continuation of application No. 12/295,280, filed as application No. PCT/EP2007/052873 on Mar. 26, 2007, now Pat. No. 8,195,600.

(30) Foreign Application Priority Data

Apr. 1, 2006 (GB) .................................. 0606639.3

(51) Int. Cl.
*G06F 7/00* (2006.01)
*G06F 17/30* (2006.01)
*G06F 3/06* (2006.01)
*G06F 17/00* (2006.01)

(52) U.S. Cl.
CPC ............ *G06F 3/0689* (2013.01); *G06F 3/0605* (2013.01); *G06F 3/0643* (2013.01);
(Continued)

(58) Field of Classification Search
CPC ..................... G06F 17/30575; G06F 17/30581

USPC .................................................. 707/610, 619
See application file for complete search history.

(56) References Cited

U.S. PATENT DOCUMENTS 5,835,954 A 11/1998 Duyanovich et al.
6,035,373 A 3/2000 Iwata
(Continued)

FOREIGN PATENT DOCUMENTS

WO 0229807 4/2002
WO 2007113160 10/2007

OTHER PUBLICATIONS

Written Opinion of the International Searching Authority, dated Apr. 2005, for International Application No. PCT/EP2007/052873, filed Mar. 26, 2007, 5 pages.
(Continued)

*Primary Examiner* — Kannan Shanmugasundaram
(74) *Attorney, Agent, or Firm* — Rabindranath Dutta; Konrad, Raynes, Davda and Victor LLP

(57) ABSTRACT

An apparatus is operable with a host and a data storage component for controlling expansion of storage, and comprises: an allocating component responsive to a user input for allocating an expanded target storage space to a file system element to thereby make an expanded file system element; a file system metadata component for maintaining file system metadata including metadata for said expanded file system element; a file system I/O component responsive to said file system metadata component for controlling file system I/O between said host and said storage component; and a synchronizing component responsive to said file system metadata component for synchronizing data between a source storage space and said expanded target storage space; wherein said file system I/O component is operable to use said file system metadata component to access said expanded file system element prior to completion of action of said synchronizing component.

18 Claims, 2 Drawing Sheets

(52) U.S. Cl.
CPC ............ *G06F 3/0647* (2013.01); *G06F 3/0665* (2013.01); *G06F 17/30575* (2013.01); *G06F 17/30581* (2013.01)

(56) References Cited

U.S. PATENT DOCUMENTS

| | | | |
|---|---|---|---|
| 6,230,239 | B1 | 5/2001 | Sakaki et al. |
| 6,654,830 | B1 | 11/2003 | Taylor |
| 6,832,289 | B2 | 12/2004 | Johnson |
| 2002/0004890 | A1* | 1/2002 | Ofek et al. ............... 711/161 |
| 2002/0035668 | A1 | 3/2002 | Nakano |
| 2005/0147130 | A1* | 7/2005 | Hurwitz ............ G06F 17/30578 370/503 |
| 2005/0188166 | A1* | 8/2005 | Fujibayashi et al. .......... 711/162 |

OTHER PUBLICATIONS

International Preliminary Report on Patentabilit, dated Apr. 1, 2006, for International Application No. PCT/EP/2007/052873, filed Mar. 26, 2007, 6 pgs.

PCT International SEarch REport dated Jul. 2, 2007 for Application PCT/EP2007/052873 filed Mar. 26, 2007.

First Office Action dated Apr. 19, 2011, pp. 1-12, for U.S. Appl. No. 12/295,280, filed Jul. 17, 2009 by inventors John Mark Clifton et al.

Response to first office Action dated Jul. 19, 2011, pp. 1-12, for U.S. Appl. No. 12/295,280, filed Jul. 17, 2009 by inventors John Mark Clifton et al.

Final office Action dated Oct. 17, 2011, pp. 1-15, for U.S. Appl. No. 12/295,280, filed Jul. 17, 2009 by inventors John Mark Clifton et al.

Response to Final Office Action dated Jan. 13, 2012, pp. 1-8, for U.S. Appl. No. 12/295,280, filed Jul. 17, 2009 by inventors John Mark Clifton et al.

Pre-Appeal Brief Request for Review , dated Jan. 17, 2012, pp. 1-6, for U.S. Appl. No. 12/295,280, filed Jul. 17, 2009 by inventors John Mark Clifton et al.

Notice of Appeal From the Examiner to the Board of Patent Appeals and Interferences, dated Jan. 17, 2012 1pp., for U.S. Appl. No. 12/295,280, filed Jul. 17, 2009 by inventors John Mark Clifton et al.

Notice of Allowance dated Feb. 1, 2012, pp. 1-12, for U.S. Appl. No. 12/295,280, filed Jul. 17, 2009 by inventors John Mark Clifton et al.

* cited by examiner

NON-DISRUPTIVE FILE SYSTEM ELEMENT RECONFIGURATION ON DISK EXPANSION

FIELD OF THE INVENTION

The present invention relates to technology for controlling data storage systems, and more particularly for controlling the non-disruptive expansion of file systems, or of elements within file systems, when additional space is provided in a storage system.

BACKGROUND OF THE INVENTION

Data storage systems store customer data in file systems, which have their physical embodiment in storage on, for example, disk, tape, or in memory. The present invention relates to such storage systems, which may comprise disk storage, such as computer hard disks. It will be clear to one of ordinary skill in the art, however, that other storage devices, including, but not limited to, tape and flash memory devices, may also be included in such a system.

When desktop users run out of space on their hard disks, they want more. It is not always an option to just add a second hard disk in the long term, so the original hard disk must be replaced with a larger one. Doing so requires the operating system to be reinstalled as well as all of the user's existing data to be copied across. This typically requires downtime on the part of the user's computer—it can often take the best part of a day to perform all of the necessary work to do this migration. In this context 'downtime' refers to both the time the computer is required to be powered down (to physically add the second disk) and the time the users are unable to perform their usual work because data is being moved, or because software programs and the like are being reinstalled.

One option is to use software RAID to mirror the data of the original disk to the new disk (RAID 1). However this has the limitation that it provides an exact mirror of the original disk, and so the additional space cannot be added to the existing file systems until the disks are synchronised and the RAID relationship has been removed.

It is well known in the enterprise-level systems art to provide means for migrating data, as such, from one storage medium to another. The second medium may be larger, providing extra space which can later be used by file systems or partitions. In some cases, such a migration may be arranged to minimise disruption and downtime of large commercial data processing systems. Examples are disclosed in, for example, U.S. Pat. No. 6,832,289, U.S. Pat. No. 5,835,954 and U.S. Pat. No. 6,230,239. None of these, however, discloses or contemplates any provision for the allocation of the newly-acquired expanded storage space to partitions or file systems until after completion of the migration.

A product such as PartitionMagic™ (PartitionMagic is a trademark of Symantec Corporation) allows users to manage their partitions and disks. However, this management activity cannot be done as a background task, and so a large amount of downtime is still required.

In the light of the problems detailed above, it would be highly desirable to have a technological means for permitting a user to control the non-disruptive expansion and space allocation of file systems, or of elements within file systems, when additional space is provided in a storage system.

SUMMARY OF THE INVENTION

The present invention accordingly provides, in a first aspect, an apparatus operable with a host and a data storage component for controlling expansion of storage, comprising: an allocating component responsive to a user input for allocating an expanded target storage space to a file system element to thereby make an expanded file system element; a file system metadata component for maintaining file system metadata including metadata for said expanded file system element; a file system I/O component responsive to said file system metadata component for controlling file system I/O between said host and said storage component; and a synchronizing component responsive to said file system metadata component for synchronizing data between a source storage space and said expanded target storage space; wherein said file system I/O component is operable to use said file system metadata component to access said expanded file system element prior to completion of action of said synchronizing component.

Preferably, said file system element is a file system hierarchy.

Preferably, said target storage space comprises a partition.

Preferably, said host comprises a personal computer.

Preferably, said data storage component comprises a hard disk.

Preferably, said file system metadata component comprises a bitmap.

Preferably, said file system metadata component is stored in reserved storage.

Preferably, said synchronizing component is operable as a background processing component.

Preferably, said synchronizing component is operable at a selectable priority of operation.

In a second aspect, there is provided a method operable in a system with a host and a data storage component for controlling expansion of storage, comprising the steps of: allocating, responsive to a user input, an expanded target storage space to a file system element to thereby make an expanded file system element; maintaining file system metadata including metadata for said expanded file system element; responsive to said file system metadata, controlling file system I/O between said host and said storage component; and responsive to said file system metadata component, synchronizing data between a source storage space and said expanded target storage space; wherein controlling said file system I/O comprises using said file system metadata to access said expanded file system element prior to completion said step of synchronizing data.

Preferably, said file system element is a file system hierarchy.

Preferably, said target storage space comprises a partition.

Preferably, said host comprises a personal computer.

Preferably, said data storage component comprises a hard disk.

Preferably, said file system metadata comprises a bitmap.

Preferably, said file system metadata is stored in reserved storage.

Preferably, said step of synchronizing component is operable as a background process.

Preferably, said step of synchronizing is operable at a selectable priority of operation.

In a third aspect, there is provided a data carrier having functional data thereon, said functional data comprising functional computer data structures to, when loaded into a computer system and operated upon thereby, enable said computer system to perform all the steps of a method according to the second aspect.

In a fourth aspect, there is provided a computer program comprising computer program code to, when loaded into a computer system and executed thereon, cause said computer system to perform all the steps of a method according to the second aspect.

Preferred embodiments of the invention thus contemplate, in their broadest aspect, a technical framework for permitting a user to control the non-disruptive expansion and space allocation of file systems, or of elements within file systems, when additional space is provided in a storage system.

A preferred embodiment of the invention thus provides a method by which a hard disk and the file systems on it can be mirrored to a second drive and by which the extra space of the second drive, allocated according to the user's preferences, can be made available for use within those file systems immediately.

The mirroring action may occur as a background computer operation, and so requires minimal downtime of the computer.

The additional space may be made available on the second drive before the mirroring is complete.

Once the mirroring is complete, the original disk may be taken out of use, and may be removed at the user's discretion.

BRIEF DESCRIPTION OF THE DRAWINGS

A preferred embodiment of the present invention will now be described, by way of example only, with reference to the accompanying drawing figures, in which.

DETAILED DESCRIPTION OF THE PREFERRED EMBODIMENTS

Figure 1:
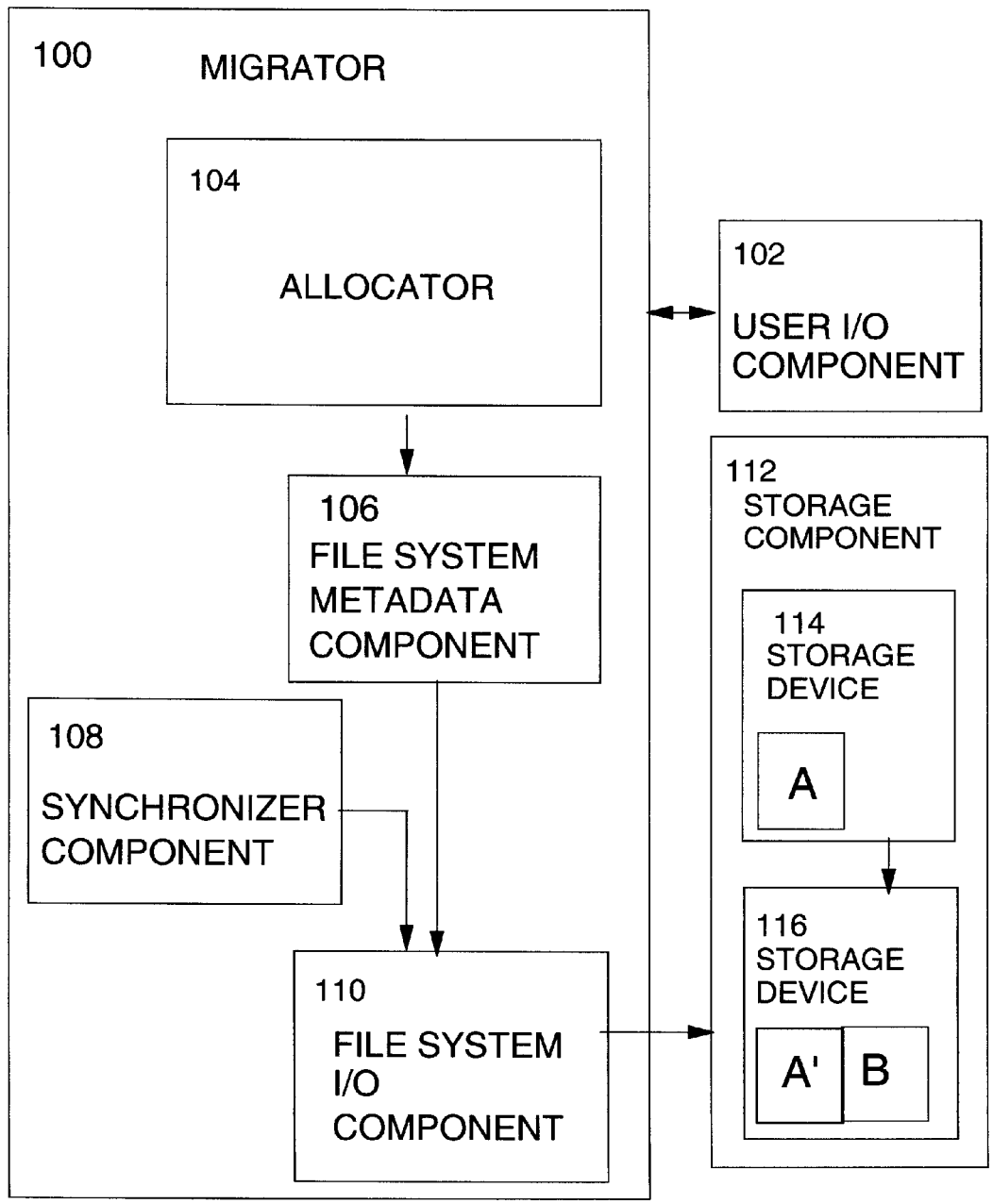
FIG. 1 shows in schematic form an arrangement of apparatus in accordance with a preferred embodiment of the present invention.

FIG. 1 shows in schematic form an exemplary arrangement of apparatus in accordance with one preferred embodiment of the present invention.

In a preferred embodiment of the present invention in the form of an arrangement of apparatus, as shown in FIG. 1, there is provided a migrator 100, operatively connected to a user I/O component 102, and to a storage component 112, comprising storage devices 114, 116. The system of the preferred embodiment is positioned at a level between the operating system and the disks and so is able to intercept the I/O performed to the disks.

Migrator 100 comprises an allocator 104, operable to accept user requests from user I/O component 102 for allocation of space to file systems or file system elements. Allocator 104 provides a configuration interface to the user to choose how the migration should be done.

Migrator 100 further comprises a file system metadata component 106 for maintaining metadata descriptive of the state (for example, a bitmap showing whether a data item has been copied or not yet copied) of any file systems and file system elements that are subject to migration using the preferred embodiment of the present invention.

Migrator 100 also comprises a synchronizer component 108 for synchronizing the data between the source storage device, in the example, storage device 114 and the target storage device, in the example, storage device 116, based on the data supplied by file system metadata component 106. Information from the file system metadata component 106 and synchronizer component 108 is used to control the activities of file system I/O component 110, which performs I/O activities to the storage devices 114, 116 in the storage component 112.

The basic flow for the migration process is broadly as follows:

1. A user decides to migrate to a larger disk.
2. The larger disk is connected to the computer; this may require the machine to be shut down.
3. The user is then able to select how the migration should occur for each of the file systems on the disk. The main user-selectable option is how the additional space of the new disk should be distributed across the existing file systems. A further option may be the rate at which the synchronisation should occur in the background. Further refinements and additions to these basic options will be clear to one of ordinary skill in the programming art.

In the example shown in FIG. 1, file system A is to be migrated from storage device 114 to storage device 116 with the additional space B made available so the file system on storage device 116 will comprise the larger space A'+B.

Once the user has chosen how the migrations should occur, he or she can then initiate the migration. Once any expanded space allocations have been made and migration has been initiated, the file system metadata held by file system metadata component 106 is modified as appropriate (by expansion, for example) for the particular file system so that the file system can determine that additional space has been made available for particular file system elements. From the user's perspective, the file system is now of the larger size and is completely available for use.

Invisibly to the user, synchronizer component 108 of the migrator 100 is actively synchronising the contents of the file system as stored on storage devices 114 and 116. This is done as follows:

1. Any I/O (read or write) that is addressed to a block in the B portion of the file system is sent to storage device 116 by the file system I/O component 110.
2. Any read that is addressed to a block in the A portion of the file system is sent to storage device 114 by the file system I/O component 110 to be satisfied from A.
3. Metadata (for example, a bitmap) is maintained by file system metadata component 106 of which blocks of A have been mirrored to A'.
4. Any write that is addressed to a block in the A portion of the file system is sent by the file system I/O component 110 to both the source storage device 114 to be written to A and to the target storage device 116 to be written to A'; it is not completed until both writes are complete. The bitmap is then updated by file system metadata component 106 to mark this block as being in synchronization.
5. A background process under control of synchronizer component 108 runs through the bitmap (at a priority rate that may be specified by the user when setting up the migration) to copy any unsynchronized data from A to A' by initiating writes by file system I/O component 110. The bitmap is updated by file system metadata component 106 to record the progress of this synchronization.
6. Once the bitmap processing under control of synchronizer component 108 is complete the system determines that A and A' are now synchronised. The storage device containing A is now no longer required, and so the system can start solely using the new storage device.

As will be clear to one of ordinary skill in the art, if the storage device that is to be migrated is the system's boot device, the Master Boot Record will also have to be copied to the new device and altered where necessary to reflect the expanded partitions, in addition to the previously-described copying of the file systems on the storage device.

7. The user is prompted that the old disk is no longer actively being used and so it can be removed.

The preferred embodiment of the present invention in the form of an apparatus thus advantageously provides for the non-disruptive expansion of file systems, or of elements within file systems, when additional space is provided in a storage system.

The bitmap that is used to track the migration progress may be stored on the new disk in a reserved area not available to the user. By keeping this information on disk in this way, the user is able to shut down the computer without losing track of the migration progress, which can thus be resumed at a later time.

Figure 2:
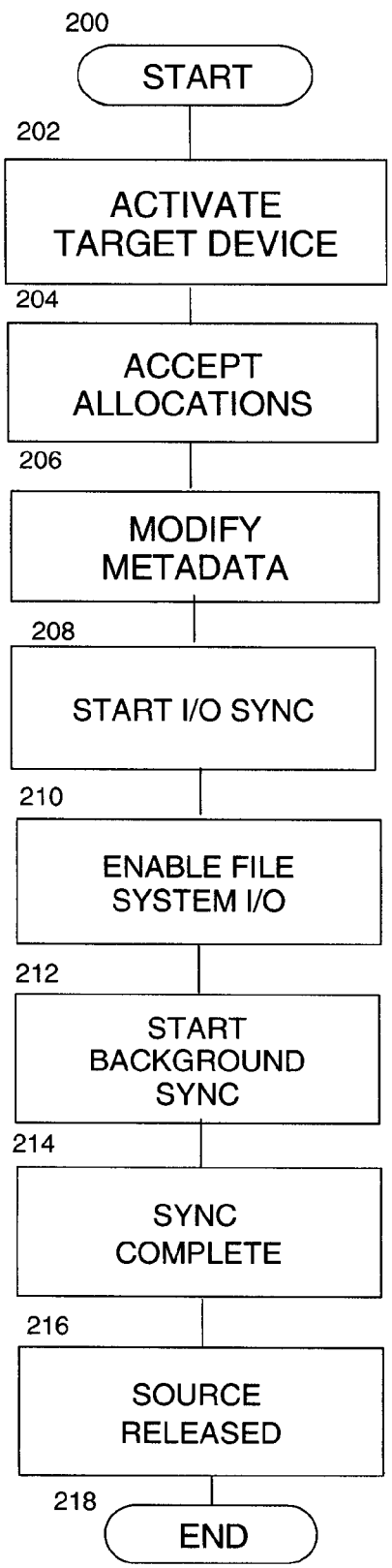
FIG. 2 shows in flowchart form one method or one logic arrangement by which a method of operation according to a preferred embodiment of the present invention may be implemented.

Turning now to FIG. 2, there is shown in flowchart form one method or one logic arrangement in which a method of operation according to a preferred embodiment of the present invention may be implemented.

In FIG. 2, following START step 200, at step 202 a target storage device is activated. At step 204, user input is accepted to determine the allocations of target storage space to file systems (or, in an alternative that will be clear to one of ordinary skill in the art, of file system elements).

At step 206, file system metadata is modified to reflect the allocations of target storage space to file systems resulting from step 204. At step 208, I/O-initiated synchronization is started, and file system I/O is enabled at step 210. At step 212, background synchronization is enabled and continues in parallel with I/O-initiated synchronization until the file system metadata indicates that synchronization is completed at step 214. At step 216, the source storage device is "released" and may be taken offline, as it is no longer needed. The process completes at END step 218.

The preferred embodiment of the present invention in the form of a method or logic arrangement thus advantageously provides for the non-disruptive expansion of file systems, or of elements within file systems, when additional space is provided in a storage system.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

The invention claimed is:

1. An apparatus operable with a host and a data storage component, comprising:
   a computational device, comprising:
      a processor;
      an allocating component responsive to a user input to allocate an expanded target storage space to a file system element to make an expanded file system element;
      a file system metadata component to maintain file system metadata including metadata for said expanded file system element;
      a file system Input/Output (I/O) component responsive to said file system metadata component to control file system I/O between said host and said data storage component; and
      a synchronizing component responsive to said file system metadata component to synchronize data between a source storage space and said expanded target storage space, wherein said synchronizing component is operable as a background processing component, wherein said synchronizing component is operable at a selectable priority of operation specified by a user and updates a bitmap that indicates whether a data item has been copied, wherein said file system I/O component is operable to use said file system metadata component to access said expanded file system element prior to completion of action of said synchronizing component, wherein said source storage space stores a file system that is to be migrated to said expanded target storage space having an additional space beyond that provided by said source storage space, and wherein said source storage space is provided by a source storage device and said expanded target storage space is provided by a target storage device, said synchronizing data further comprising:

sending, any selected write that is addressed to a block of said file system stored in said source storage device, to both said source storage device and said target storage device, wherein said selected write is not completed until writing of said selected write to both said source storage device and said target storage device is complete; and sending any selected read or write that is addressed to a block of an expanded file system stored in said target storage device but not in said source storage device, to said target storage device, wherein:

determining that said source storage device is a boot device, and copying a master boot record to said target storage device and altering said master boot record to reflect expanded partitions; and an indication is provided to a user to indicate that said source target device is no longer being used actively and can be removed.

2. The apparatus of claim 1, wherein said synchronizing data further comprises:

sending any selected read that is addressed to a block of the file system stored in said source storage device, to said source storage device to be satisfied from said source storage device.

3. The apparatus of claim 1, wherein the selectable priority of operation is specified by the user while setting up a migration of the file system.

4. The apparatus of claim 1, wherein a data structure records a progress of synchronization of data between said source storage device and said target storage device.

5. The apparatus of claim 4, wherein the data structure is stored on said target storage device in a reserved area that is not available to the user, and wherein if the computational device is shut down by the user, the synchronization of data between said source storage device and said target storage device is continued at a later time that is subsequent to a time of the shut down of the computational device.

6. The apparatus of claim 1, wherein if the computational device is shut down by the user, the synchronization of data between said source storage device and said target storage device is continued at a later time that is subsequent to a time of the shut down of the computational device.

7. A method, comprising:

allocating, responsive to a user input, an expanded target storage space to a file system element to make an expanded file system element;

maintaining file system metadata including metadata for said expanded file system element;

responsive to said file system metadata, controlling file system I/O between a host and a storage component; and responsive to said file system metadata, synchronizing data between a source storage space and said expanded target storage space, wherein said synchronizing is performed via a background process, wherein said synchronizing is operable at a selectable priority of operation specified by a user and updates a bitmap that indicates whether a data item has been copied, wherein controlling said file system I/O comprises using said file system metadata to access said expanded file system element prior to completion of the synchronizing of the data, wherein said source storage space stores a file system that is to be migrated to said expanded target storage space having an additional space beyond that provided by said source storage space, and wherein said source storage space is provided by a source storage device and said expanded target storage space is provided by a target storage device, said synchronizing data further comprising:

sending, any selected write that is addressed to a block of said file system stored in said source storage device, to both said source storage device and said target storage device, wherein said selected write is not completed until writing of said selected write to both said source storage device and said target storage device is complete; and sending any selected read or write that is addressed to a block of an expanded file system stored in said target storage device but not in said source storage device, to said target storage device, wherein:

determining that said source storage device is a boot device, and copying a master boot record to said target storage device and altering said master boot record to reflect expanded partitions; and an indication is provided to a user to indicate that said source target device is no longer being used actively and can be removed.

8. The method of claim 7, wherein said synchronizing data further comprises:

sending any selected read that is addressed to a block of the file system stored in said source storage device, to said source storage device to be satisfied from said source storage device.

9. The method of claim 7, wherein the selectable priority of operation is specified by the user while setting up a migration of the file system.

10. The method of claim 7, wherein a data structure records a progress of synchronization of data between the source storage device and the target storage device.

11. The method of claim 10, wherein the data structure is stored on the target storage device in a reserved area that is not available to the user, and wherein if a computational device is shut down by the user, the synchronization of data between the source storage device and the target storage device is continued at a later time that is subsequent to a time of the shut down of the computational device.

12. The method of claim 7, wherein if a computational device is shut down by the user, the synchronization of data between the source storage device and the target storage device is continued at a later time that is subsequent to a time of the shut down of the computational device.

13. A non-transitory tangible computer readable medium having stored therein computer program code, wherein the computer program code when loaded into a computer system and executed thereon, cause said computer system to perform:

allocating, responsive to a user input, an expanded target storage space to a file system element to make an expanded file system element;

maintaining file system metadata including metadata for said expanded file system element;

responsive to said file system metadata, controlling file system I/O between a host and a storage component; and responsive to said file system metadata, synchronizing data between a source storage space and said expanded target storage space, wherein said synchronizing is performed via a background process, wherein said synchronizing is operable at a selectable priority of operation specified by a user and updates a bitmap that indicates whether a data item has been copied, wherein controlling said file system I/O comprises using said file system metadata to access said expanded file system element prior to completion of the synchronizing of the data, wherein said source storage space stores a file system that is to be migrated to said expanded target storage space having an additional space beyond that provided by said source storage space, and wherein said source storage space is provided by a source storage device and said expanded target storage space is provided by a target storage device, said synchronizing data further comprising:

sending, any selected write that is addressed to a block of said file system stored in said source storage device, to both said source storage device and said target storage device, wherein said selected write is not completed until writing of said selected write to both said source storage device and said target storage device is complete; and sending any selected read or write that is addressed to a block of an expanded file system stored in said target storage device but not in said source storage device, to said target storage device, wherein:

determining that said source storage device is a boot device, and copying a master boot record to said target storage device and altering said master boot record to reflect expanded partitions; and an indication is provided to a user to indicate that said source target device is no longer being used actively and can be removed.

14. The non-transitory tangible computer readable medium of claim 13, wherein said synchronizing data further comprises:

sending any selected read that is addressed to a block of the file system stored in said source storage device, to said source storage device to be satisfied from said source storage device.

15. The non-transitory tangible computer readable medium of claim 13, wherein the selectable priority of operation is specified by the user while setting up a migration of the file system.

16. The non-transitory tangible computer readable medium of claim 13, wherein a data structure records a progress of synchronization of data between the source storage device and the target storage device.

17. The non-transitory tangible computer readable medium of claim 16, wherein the data structure is stored on the target storage device in a reserved area that is not available to the user, and wherein if a computational device is shut down by the user, the synchronization of data between the source storage device and the target storage device is continued at a later time that is subsequent to a time of the shut down of the computational device.

18. The non-transitory tangible computer readable medium of claim 13, wherein if a computational device is shut down by the user, the synchronization of data between the source storage device and the target storage device is continued at a later time that is subsequent to a time of the shut down of the computational device.

* * * * *